(12) United States Patent
Kulkarni et al.

(10) Patent No.: US 11,348,651 B2
(45) Date of Patent: May 31, 2022

(54) HOT CARRIER INJECTION FUSE MEMORY

(71) Applicant: Intel Corporation, Santa Clara, CA (US)

(72) Inventors: Sarvesh Kulkarni, Hillsboro, OR (US);
Vincent Dorgan, Hillsboro, OR (US);
Inanc Meric, Portland, OR (US);
Venkata Krishna Rao Vangara, Hillsboro, OR (US); Uddalak Bhattacharya, Beaverton, OR (US);
Jeffrey Hicks, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 16/147,119

(22) Filed: Sep. 28, 2018

(65) Prior Publication Data

US 2020/0105356 A1    Apr. 2, 2020

(51) Int. Cl.
*G11C 17/16* (2006.01)
*G11C 17/18* (2006.01)

(52) U.S. Cl.
CPC .............. *G11C 17/16* (2013.01); *G11C 17/18* (2013.01)

(58) Field of Classification Search
CPC ..... G11C 17/16; G11C 17/18; H04L 2209/12; H04L 9/3278; G09C 1/00
See application file for complete search history.

(56) References Cited

U.S. PATENT DOCUMENTS 9,418,745 B1 *   8/2016   Chen ................... G11C 16/10
10,423,805 B2 *   9/2019   Boivie ................. G11C 16/14

* cited by examiner

*Primary Examiner* — Ajay Ojha
(74) *Attorney, Agent, or Firm* — Schwabe, Williamson & Wyatt, P.C.

(57) ABSTRACT

Memory cell circuitry is disclosed. The memory cell circuitry includes a first transistor configured to have a threshold voltage of the first transistor modulated by hot carrier injection, a second transistor coupled to the first transistor and configured to have a threshold voltage of the second transistor modulated by hot carrier injection, a word line coupled to a gate of the first transistor and to a gate of the second transistor, a first bit line coupled to the first transistor and a second bit line coupled to the second transistor. In addition, the memory cell circuitry includes a source line coupled to the drain of the first transistor and to the drain of the second transistor, the word line and the source line configured to cause hot carrier injection (HCI) into the first transistor when a first supply voltage is applied to the word line and the source line, and the second bit line is floated and the first bit line is grounded. The word line and the source line are configured to cause hot carrier injection into the second transistor when the first supply voltage is applied to the word line and the source line, and the first bit line is floated and the second bit line is grounded. Methods utilizing this technology for generating a multi-time programmable non-volatile memory and a random number generator for physical unclonable function applications are included in this disclosure.

16 Claims, 15 Drawing Sheets

Operation
Program

|  | WL | SL | BL | BLB |
|---|---|---|---|---|
| WR "1" | Vprg | Vprg | 0V | Float |
| WR "0" | Vprg | Vprg | Float | 0V |

Sense

|  | WL | SL | BL | BLB |
|---|---|---|---|---|
| RD "1" | Vccf | Vccf | Vsns - $\Delta_{SA}$ | Vsns |
| RD "0" | Vccf | Vccf | Vsns | Vsns - $\Delta_{SA}$ |

Reprogramming Sequence

| | Vth of 'NT' | Vth of 'NC' | Differential signal to SA ('BLB' - 'BL') | Data stored (SA output) |
|---|---|---|---|---|
| Initial (at fabrication) | $Vth_{NOM}$ | $Vth_{NOM}$ | 0 | Random |
| | | ⇩ First programming (write "1") | | |
| WR "1" | $Vth_{NOM} + \Delta$ | $Vth_{NOM}$ | $+\Delta_{SA}$ | 1 |
| | | ⇩ First reset (write "0") | | |
| WR "0" | $Vth_{NOM} + \Delta$ | $Vth_{NOM} + 2\Delta$ | $-\Delta_{SA}$ | 0 |
| | | ⇩ Second reset (write "1") | | |
| WR "1" | $Vth_{NOM} + 3\Delta$ | $Vth_{NOM} + 2\Delta$ | $+\Delta_{SA}$ | 1 |

FIG. 1C

Program

|       | WL     | SL     | BL    | BLB   |
|-------|--------|--------|-------|-------|
| WR "1" | VCCFHV | VCCFHV | 0V    | Float |
| WR "0" | VCCFHV | VCCFHV | Float | 0V    |

Sense

|       | WL   | SL   | BL          | BLB         |
|-------|------|------|-------------|-------------|
| RD "1" | VCCF | VCCF | Vdiv - Δ    | Vdiv        |
| RD "0" | VCCF | VCCF | Vdiv        | Vdiv - Δ    |

HOT CARRIER INJECTION FUSE MEMORY

TECHNICAL FIELD

Embodiments of the disclosure pertain to memory and, in particular, to hot carrier injection fuse memory.

BACKGROUND

A one-time programmable (OTP) ROM device is a device that can be programmed once to permanently store any kind of information (data for chip IDs, security keys, product feature selection, memory redundancy, device trimming, or MCU code memory). For example, on-chip one-time-programmable fuse ROM (OTP-ROM) enables the storage of information for unit identification, cache redundancy repair, post-silicon circuit tuning, etc.

Alternative approaches featuring non-volatile re-programmability include embedded nonvolatile memory (NVM) such as STTRAM/RRAM or off-chip NVMs such as flash memory. In a previous approach involving HCI-based memories, negative voltages are used to erase the state of the memory bits before they are reprogrammed.

The embedded or off-chip NVM solutions are not standard process compatible and can incur significant added process complexity and cost overheads. As regards, the reprograming approach for HCI based memories, the negative voltages that are required are not typically available on chip. On-chip generation of such negative voltages requires complex circuitry such as negative charge pumps which carry area and power overheads as well as yield risks.

In a previous approach, gate-oxide antifuse is used as a secure fuse technology that relies upon a voltage-driven programming event. Gate-oxide antifuse arrays are denser than metal fuse arrays. Gate-oxide antifuse physical unclonable function (PUF) circuits have been designed for different types of circuit implementations including bias generation, ring-oscillators, current mirrors, cross-coupled inverters, oxide breakdown, and SRAMs.

Gate-oxide antifuse requires a very high programming voltage (approximately 5V). Thick-gate peripheral circuitry is required to prevent electrical overstress damage. This makes gate-oxide antifuse unusable for core thin-gate-only technologies. Moreover, typical PUF circuits suffer from relatively poor yield and reliability when compared to that of traditional fuse technologies, and thus require extensive masking and error code correction (ECC) schemes.

BRIEF DESCRIPTION OF THE DRAWINGS

FIG. 1C illustrates a sequence of programming events and corresponding threshold voltage shifts in transistor NT and transistor NC according to an embodiment.

DESCRIPTION OF THE EMBODIMENTS

Figures 1A, 1B:
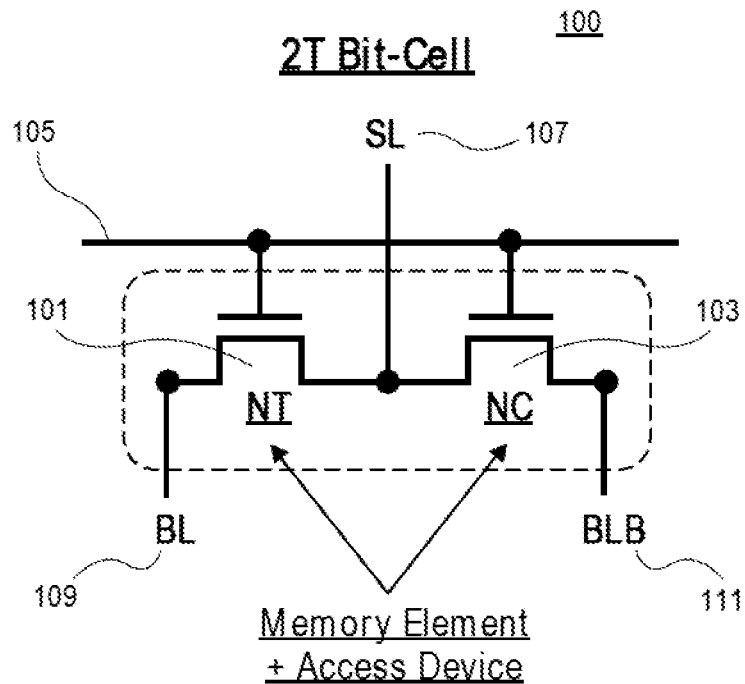
FIG. 1A is an illustration of a hot carrier injection (HCI) fuse two-transistor (2T) bit-cell according to an embodiment.
FIG. 1B shows the voltages for word line (WL), source line (SL), bit line (BL) and bit line B (BLB) that are involved in programming and sense operations for a bit cell according to an embodiment.

Hot carrier injection fuse memory is described. It should be appreciated that although embodiments are described herein with reference to example hot carrier injection fuse memory, the disclosure is more generally applicable to hot carrier injection fuse memory implementations as well as other type hot carrier injection fuse memory implementations. In the following description, numerous specific details are set forth, such as specific integration and material regimes, in order to provide a thorough understanding of embodiments of the present disclosure. It will be apparent to one skilled in the art that embodiments of the present disclosure may be practiced without these specific details. In other instances, well-known features, such as integrated circuit design layouts, are not described in detail in order to not unnecessarily obscure embodiments of the present disclosure. Furthermore, it is to be appreciated that the various embodiments shown in the Figures are illustrative representations and are not necessarily drawn to scale.

Certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The embedded or off-chip NVM solutions referred to in the background section are not standard process compatible and can incur significant added process complexity and cost overheads. As regards, the reprograming approach for HCI based memories, the negative voltages that are required are not typically available on products. On-chip generation of such negative voltages requires complex circuitry such as negative charge pumps which carry area and power overheads as well as yield risks.

The gate-oxide antifuse referred to in the background section for physical unclonable function (PUF) applications requires a very high programming voltage (approximately 5V). Thick-gate peripheral circuitry is required to prevent electrical overstress damage. This makes gate-oxide antifuse unusable for core thin-gate-only technologies. Moreover, typical PUF circuits suffer from relatively poor yield and reliability when compared to that of traditional fuse technologies, and thus require extensive masking and error code correction (ECC) schemes.

An approach that addresses and overcomes the shortcomings of previous approaches is disclosed herein. As a part of the approach, a multi-time programmable memory (MTP) is provided by utilizing threshold voltage (Vth) degradation caused by the hot-carrier phenomenon to store memory states. Using stress time as the means to modulate the threshold voltage, data written to the memory bit cells can effectively be erased and reprogrammed. Thus, a tunable sensing reference is implied that may also be applicable in other forms of memory.

In an embodiment, embedded, high-density, and non-volatile properties associated with the described memory make it a candidate for on-chip ROM/RAM/NVM and off-chip NVM/Flash replacement. In an embodiment, the MTP memory cell can enable product reconfiguration and has several applications. For example, repairing products, updating IP firmware and microcode, re-binning or delayed product binning, etc. In an embodiment, the reprogrammable function of the disclosed MTP memory cell includes the ability to erase previously stored data which is important in certain secure applications. In addition, the data stored in the HCI-based memory arrays is secure from typical hacking attacks such as visual exposure (SEM) and passive voltage contrast (PVC).

In addition, as part of the approach, hot-carrier injection (HCI) is used to induce a threshold voltage (VT) change which enables differences in VT values in a two-transistor (2T) bit-cell to be used to store a memory state. In an embodiment, the un-programmed HCI fuse bit-cell has a random value such that an HCI fuse array can be used to generate a random key for PUF applications. The secure HCI fuse technology enables the storage of security keys on-die without the risk of them being easily hacked by de-processing, and the provision of a unique chip ID for PUF applications. A dense HCI fuse array with low leakage enables Si area cost savings (i.e., smaller fuse partition) and a reduced number of fuse-dedicated package pins. Unlike antifuse, the HCI fuse solution requires a lower programming voltage, can enable a thin gate-only solution and a path to continue to scale the fuse technology in advanced nodes, because HCI is a mechanism that increases with technology scaling (i.e., reducing the transistor channel length).

FIG. 1A shows a memory bit cell according to an embodiment. FIG. 1A includes transistor 101, transistor 103, word line 105, source line 107, bit line 109 and bit line 111.

Referring to FIG. 1A, the bit cell 100 is composed of two matched NMOS transistors, NT transistor 101 and NC transistor 103. The threshold voltages of these two transistors serve as the memory element while the transistors themselves serve as bit cell access transistors that can be addressed by row decoders (driving word-line WL 105) and column decoders (driving source-line SL 107 and bit-lines BL 109 and BLB 111). Programming is performed by modulating the threshold voltage Vth of these two transistors. Sensing circuitry can be connected to the bit-line pair BL 109 and BLB 111 to detect and amplify the difference in the threshold voltages of the two transistors. The initial state of the bit cells is random as the threshold voltage of the matched pair, transistor NT 101 and transistor NC 103, are similar. FIG. 1B shows the voltages for WL 105, SL 107, BL 109 and BLB 111 that are involved in programming and sense operations for bit cell 100. To program a '1', a high program voltage (Vprg) is applied to the word line WL 105 and the source line SL 107 and the potential of the bit line 109 BL is driven to ground. The bit line BLB 111 is floated. The elevated VDS and VGS stress applied to the transistor NT 101 results in hot-carrier injection that induces a threshold voltage Vth shift A in transistor NT 101. This shift in the threshold voltage Vth transistor NT 101 is converted to a voltage differential for sensing. The unstressed nominal threshold voltage of the transistor NC 103 thus serves as the sensing reference. The writing of '0' is analogous. To sense the bits, a sense voltage (Vccf) is applied to the word line WL 105 and the source line 107 SL and a differential voltage is allowed to develop on the bit line BL 109 and the bit line BLB 111. As a bit that was written as '1' corresponds to the higher threshold voltage of the transistor NT 101, the bit line BL 109 reaches a potential that is lower than the bit line BLB 111 by a differential voltage which can be sensed by a sense amplifier (SA). In an embodiment, the sensing of '0' is analogous.

In an embodiment, reprogramming is done by modulating the magnitude of the threshold voltage shift by the duration of the device voltage stress. Higher stress time produces more threshold voltage shift. A tunable sensing reference is hence enabled wherein the threshold voltages of the transistor NT 101 or the transistor NC 103 serve alternatively as references for the other on successive writes. Thus, to reprogram a bit previously programmed to a 1, transistor NC 103 needs to be stressed for a longer duration such that its threshold voltage shift exceeds the threshold voltage originally present in transistor NT 101 by the sensing margin. In an embodiment, the process can be reversed and repeated for subsequent programming events and in that manner provides a multi-time programming feature. The mechanism of erase is similar to reprogramming wherein the transistor NC 103 is stressed for the same time as the transistor NT 101 to eliminate the differential voltage that is presented to the sensing circuitry.

FIG. 1C illustrates a sequence of programming events and the corresponding threshold voltage shifts in the transistor 'NT' 101 and the transistor 'NC' 103 according to an embodiment. In an embodiment, VthNOM corresponds to the nominal threshold voltages of the transistors at fabrication.

Figure 1D:
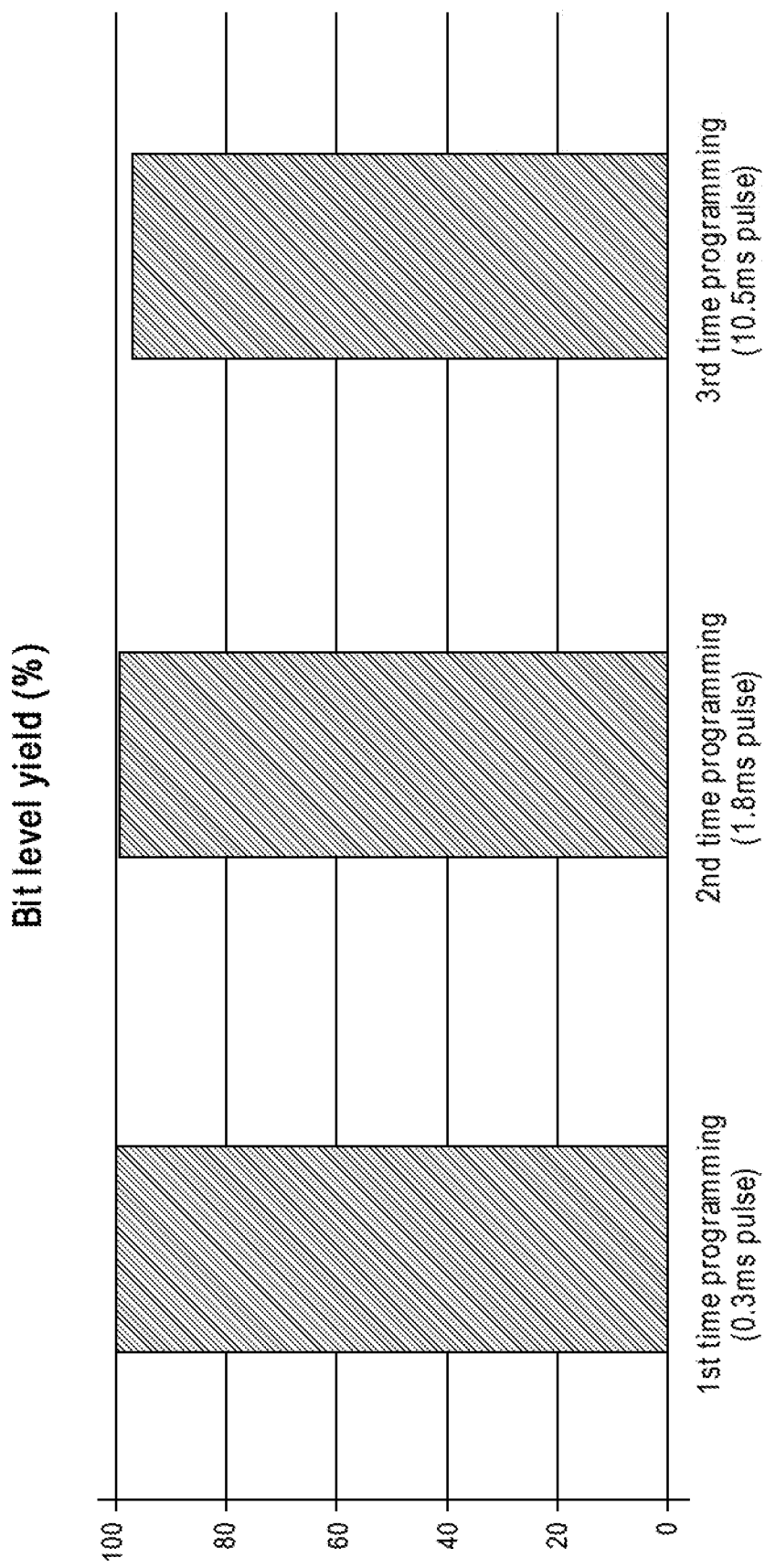
FIG. 1D is a graph of bit level yield with respect to first, second and third programing events according to one embodiment.

FIG. 1D is a graph of bit level yield for first, second and third programing events according to one embodiment. In FIG. 1D, the bit level yield data that was collected for 4 die (~100 kbit programmed) is represented. The graph corresponds to die that include full-featured high-density arrays implemented on a test-chip. Referring to FIG. 1D, bit level yield for 1st, 2nd, and 3rd programming events with 0.3 ms, 1.8 ms, and 10.5 ms stress pulses is 99.992%, 99.8%, and 98.5% respectively demonstrating effective multi-time programming. The results shown by the graph in FIG. 1D are only exemplary and other results can be provided by other embodiments.

Figure 2A:
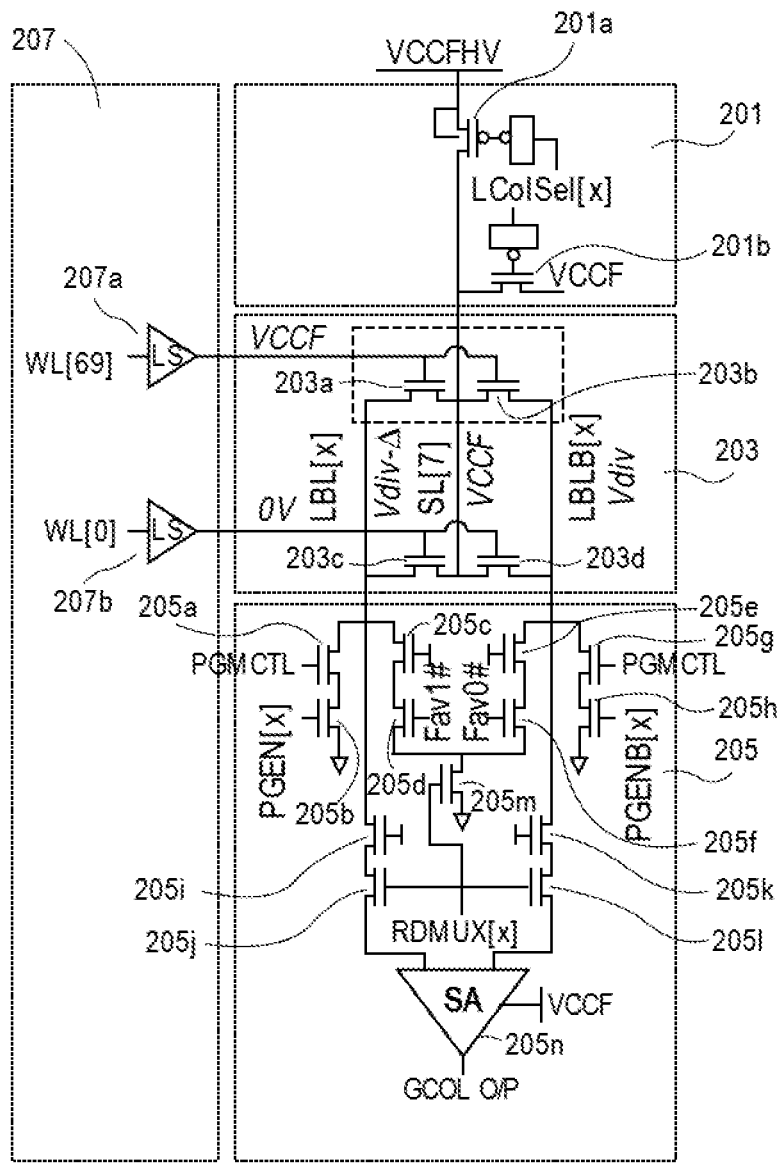
FIG. 2A is an illustration of a column of an HCI fuse memory according to an embodiment.

FIG. 2A is an illustration of a column of a hot carrier injection fuse memory 100 according to an embodiment. In the FIG. 2A embodiment, the column of the hot carrier injection fuse memory 200 includes precharge circuitry 201, bit cells 203, sense circuitry 205 and word lines 207. Precharge circuitry 201 includes transistor 201a and transistor 201b. Bit cell circuitry 203 includes transistor 203a, transistor 203b, transistor 203c and transistor 203d. Sense circuitry 205 includes transistors 205a-205l. Word lines include word lines 207a and word lines 207b.

Referring to FIG. 2A, in the precharge circuitry 201, the source of the transistor 201a and the drain of the transistor 201b are coupled to respective supply voltages. Moreover, the drain of transistor 201a is coupled to the source of transistor 201b. In addition, the drain of the transistor 201a and the source of the transistor 201b are coupled to the bit cell circuitry 203.

In the bit cell circuitry 203 the drains of the transistor 203a and the transistor 203b are coupled to form a bit cell. Moreover, the transistor 203c and the transistor 203d are coupled to form another bit cell. In an embodiment, although only two bit cells are shown, the bit cell circuitry 203 can include any suitable number of individual bit cells.

In the sense circuitry 205 the source of the transistor 205a is coupled to the drain of the transistor 205b. The source of the transistor 205c is coupled to the drain of the transistor 205d. The source of the transistor 205e is coupled to the drain of the transistor 205f. The source of the transistor 205g is coupled to the drain of the transistor 205h. The source of the transistor 205i is coupled to the drain of the transistor 205j. The source of the transistor 205k is coupled to the drain of the transistor 205l. The drain of transistor 205m is coupled to the source of the transistor 205d and the source of the transistor 205f. The sense amplifier 205n is coupled to the sources of the read multiplexor transistors 205j and 205l.

In addition, in an embodiment, the HCI fuse column includes bit-line column selects, word-line row selects associated with word lines 207, and program enables associated with transistors 205b and 205h. In an embodiment, the transistors 205c, 205d, 205e, 205f, and 205m and the sense amplifier 205n are used in sense operations.

Figure 2B:
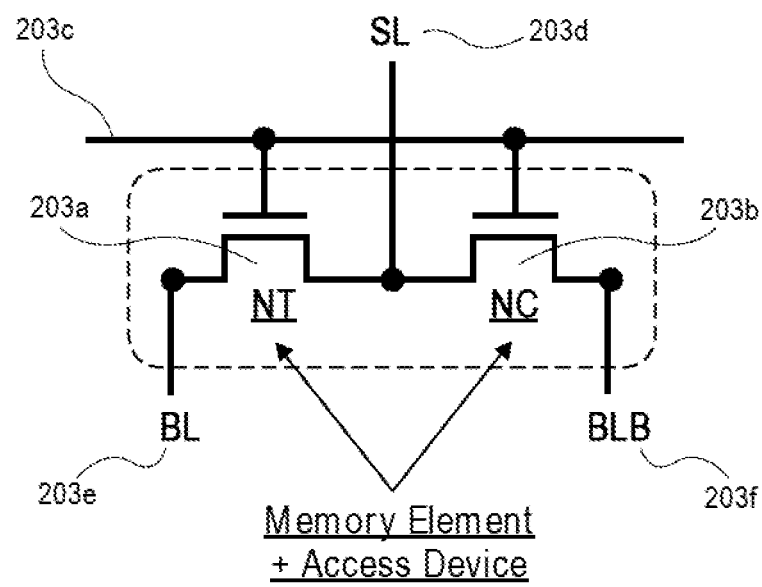
FIG. 2B is an illustration of an HCI fuse two-transistor (2T) bit-cell according to an embodiment.

FIG. 2B is a schematic of the HCI fuse two-transistor (2T) bit-cell 203 shown in FIG. 2A, according to an embodiment. In an embodiment, the herein described HCI fuse is applicable to any technology using FinFET architecture. In addition, in an embodiment, the herein described HCI fuse bit-cell can serve as a physical unclonable function (PUF) bit-cell. In an embodiment, if VT degradation is induced on the left thin-gate NMOS transistor NT 203a then the bit-cell stores a "1". Conversely, if VT degradation is induced on the right thin-gate NMOS transistor NC 203b then the bit-cell stores a "0". For area comparison, a PUF bit-cell of a previous approach has an area of 1.84 µm2 on 14 nm. In contrast, in an embodiment, the HCI fuse 2T bit-cell 203 for PUF applications such as described herein can include an area of 0.0486 µm2 on 22 nm FFL, which represents an approximately 38× reduction in area. In other embodiments, the HCI fuse 2T bit-cell 203 for PUF applications described herein can include other areas.

Figure 2C:
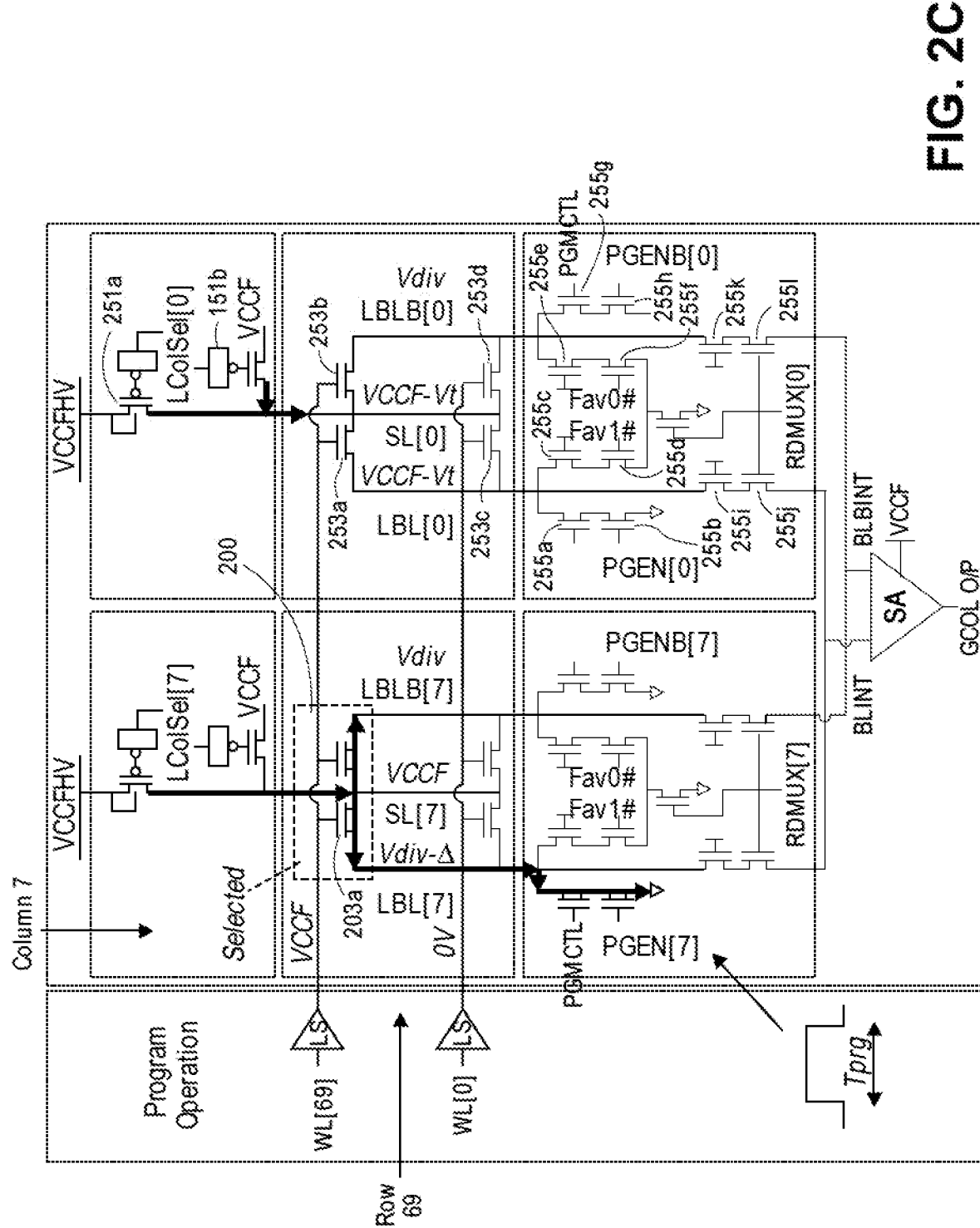
FIG. 2C is an illustration of the HCI fuse during programming operations according to an embodiment.
Figure 2D:
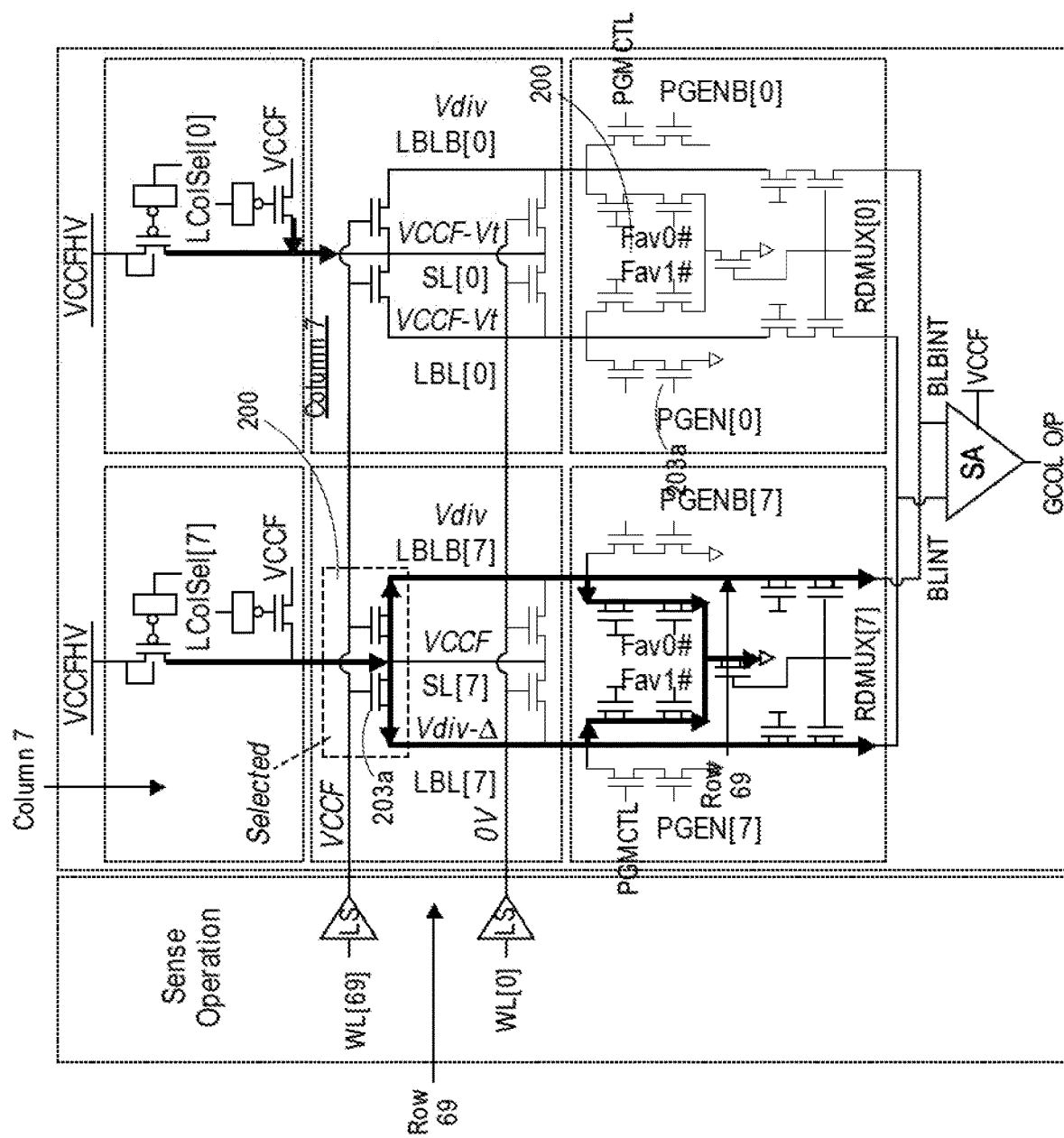
FIG. 2D is an illustration of the HCI fuse during sense operations according to an embodiment.
Figures 2E, 3:
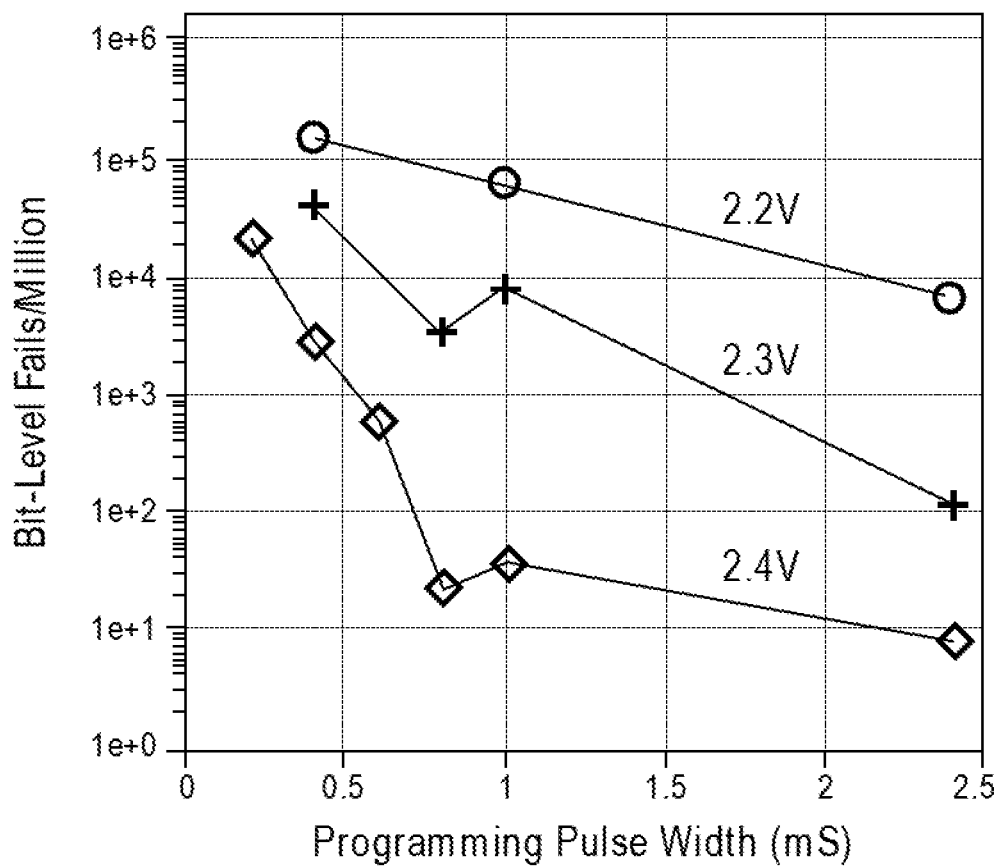
FIG. 2E shows a table of the voltages that are involved in writing and reading a "1" or a "0" as a part of programming and sense operations according to an embodiment.
FIG. 3 is a graph that shows the HCI fuse programming yield across die for various programming voltage and pulse width conditions according to an embodiment.

FIGS. 2C and 2D show respective example diagrams of the HCI fuse during programming and sense operations. In the programming example illustrated in FIG. 2C a "1" is written to the bit that corresponds to a row "69" and a local column "7" (row "69" and a local column "7" are only exemplary as the described programming and sense operations can apply to other rows and columns in a memory array). The transistor "NT" 203a in the bit cell 200 is turned ON and exposed to the programming voltage supply VCCFHV. During the sense operation as shown in FIG. 2D, the HCI-induced VT degradation is detected by the sense amplifier resulting in a readout of a "1". FIG. 2E shows a table of the voltages that are involved in writing and reading a "1" or a "0" as a part of programming and sense operations.

FIG. 3 shows the HCI fuse programming yield across 191 die for various programming voltage and pulse width conditions according to an embodiment. Referring to FIG. 3, when a combination of the programming voltage and pulse width is insufficient to create a large enough VT degradation in order to be detected by the sense amplifier, the yield is poor. This is illustrated in FIG. 3 as the graph shows that the failure rate improves significantly with increasing voltage and pulse width. However, the best programming conditions show bit-level defects per million (DPM) failure rates to be less than approximately 100. This is comparable to targets for typical Cu metal fuses. Applying a bit-level failure rate of 45 DPM to a five-bit majority (i.e., "voting") redundancy scheme would result in a unit-level <1 fail per billion for a 1024 logical bit array. In other embodiments, other failure rates can be provided. In comparison, the PUF bit-cell of a previous approach has a bit-level DPM of 5.76×104 DPM, which is about three orders of magnitude higher than the HCI fuse bit-cell of an embodiment based on optimal programming conditions. Combining the higher bit-level yield of the HCI fuse with the already significantly smaller bit-cell area results in further area savings (e.g., wafer) as compared to the previous approach.

Figure 4:
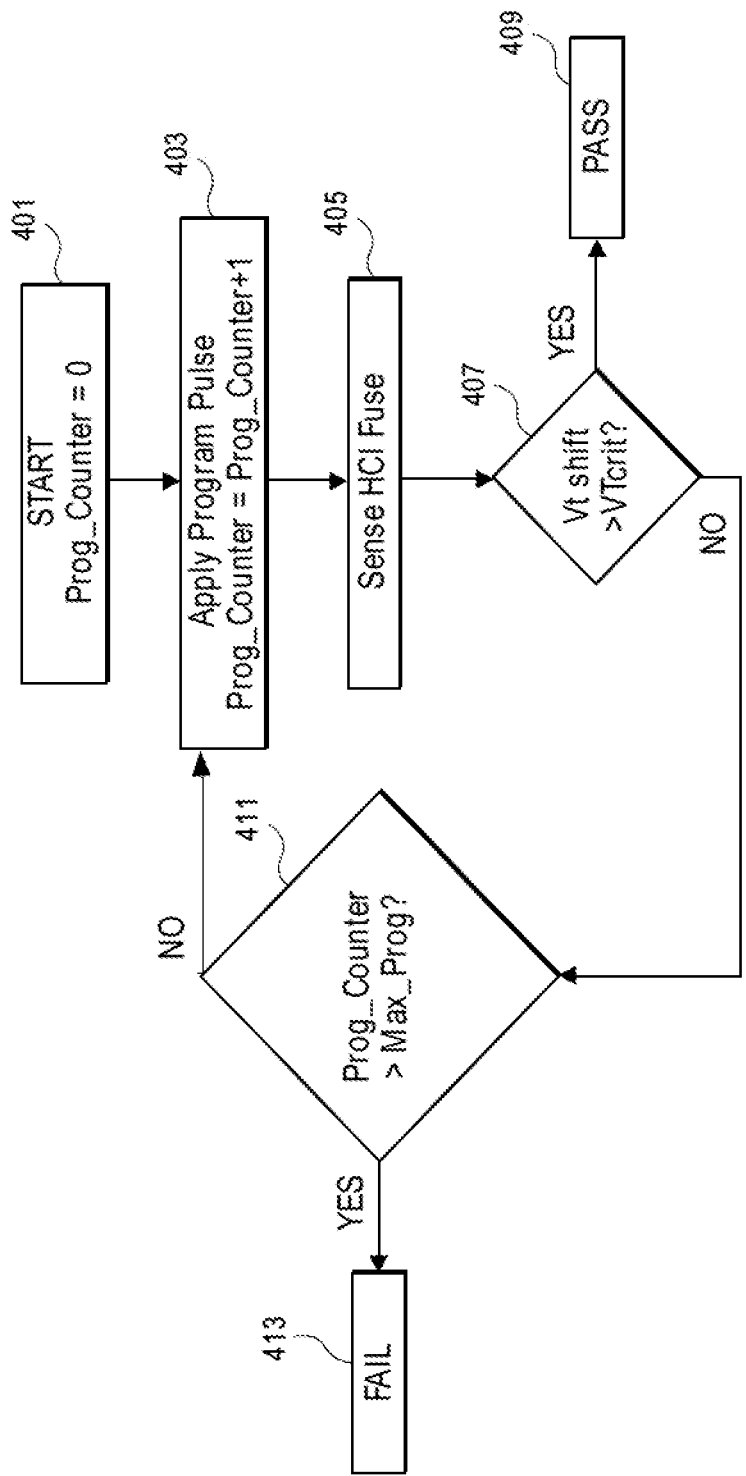
FIG. 4 is a flowchart of an example programming flow to induce a desired amount of VT shift without unnecessarily increasing the risk of electrical overstress (EOS) damage to an HCI fuse according to an embodiment.

In an embodiment, in order to further improve yield beyond that which is shown in in the graph of FIG. 3, a selective multiple-pulse "repair" flow can be enabled as shown in FIG. 4. In an embodiment, the repair flow enables a programming of the desired VT shift needed to sense a particular value to be executed, while minimizing the risk of electrical overstress (EOS) that can result in damage to the HCI fuse circuitry from unnecessarily high programming voltage.

FIG. 4 is a flowchart of an example programming flow to induce a desired amount of VT shift without unnecessarily increasing the risk of electrical overstress (EOS) damage to an HCI fuse according to an embodiment. This flow also prevents the HCI fuse from being over programmed, i.e., a VT shift that is more than required for sensing a stable state. At 401, a program counter is started. At 403, a programming pulse is applied and the program counter is incremented. At 405, the HCI fuse is sensed. At 407, it is determined if the shift in the threshold voltage VT of the transistor subjected to the programming pulse and due to hot carrier injection is greater than a predetermined voltage. If at 407 it is determined that the shift in the threshold voltage is greater than the predetermined voltage a "pass" is indicated. If at 407 it is determined that the shift in the threshold voltage is not greater than the predetermined voltage, it is determined if the program counter is greater than the maximum program count at 411. If it is determined that the program counter is greater than the maximum program count, at 413 a "fail" is indicated. If it is determined that the program counter is not greater than the maximum program count, the program counter is incremented by one in 403.

Figure 5:
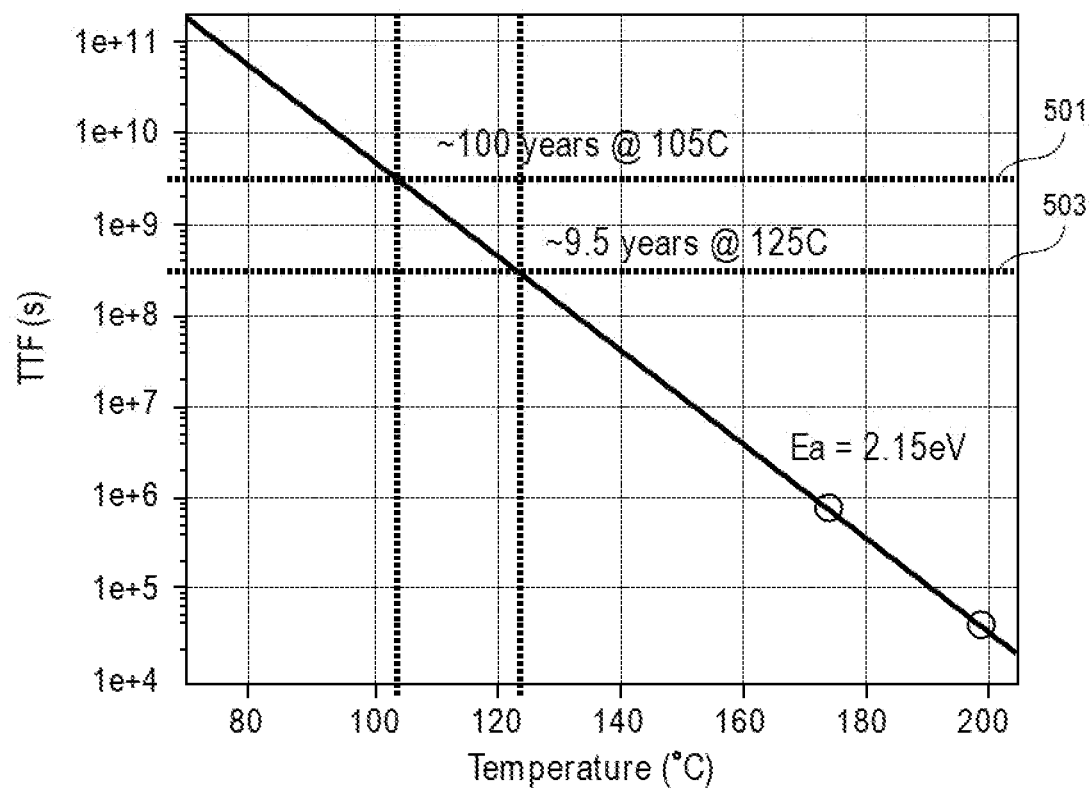
FIG. 5 shows a graph of time to failure (TTF) versus temperature.

FIG. 5 shows a graph of time to failure (TTF) versus temperature according to an embodiment. In an embodiment, the graph is based on transistors that are exposed to HCI stress, to induce VT shift, and subjected to a high-temperature bake. The level of VT "recovery" as a function of time in bake was measured. In the FIG. 5 example, the time to failure (TTF) is defined as 10% "recovery", and an activation energy (Ea) of 2.15 eV was calculated. This indicates that for typical maximum operating temperatures, e.g., 105° C. or 125° C., an HCI fuse is stable and reliable (see TTF values indicated by the lines 501 and 503 that indicate a stable and reliable fuse). It should be appreciated that these results are only exemplary of an embodiment, and in other embodiments, other activation energies and other maximum operating temperatures can be exhibited. In an embodiment, the results represent an example measure of device retention.

Figure 6:
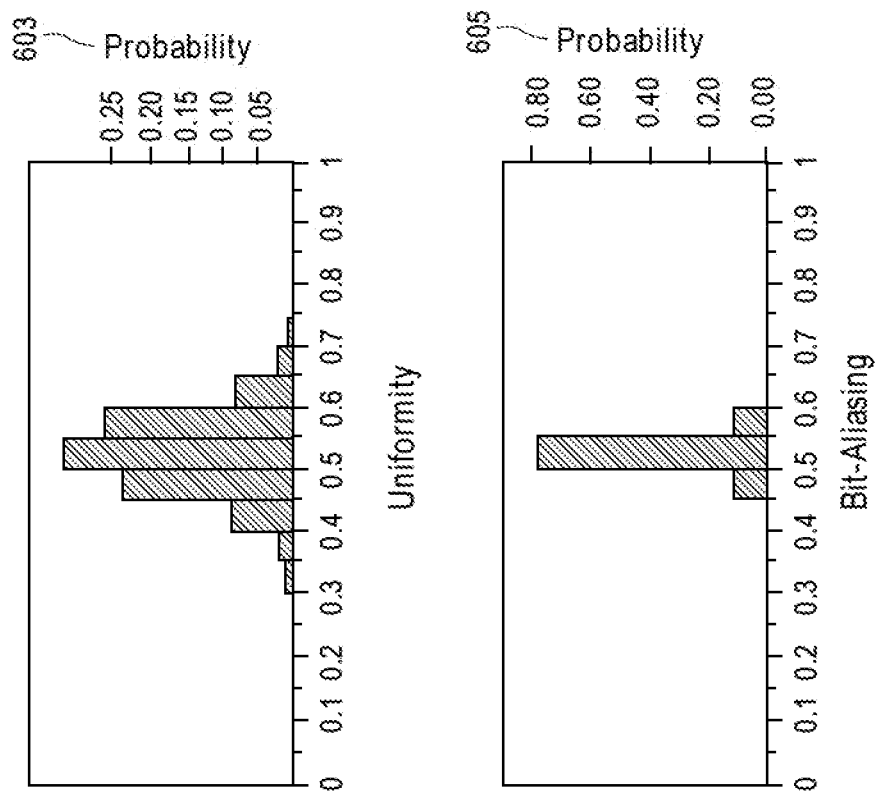
FIG. 6 shows a summary of physically unclonable function (PUF) performance metrics including uniqueness, uniformity, and bit-aliasing.

FIG. 6 shows a graphical and tabular representations of PUF performance metrics including uniqueness, uniformity, and bit-aliasing. The table 601 on the left shows the average value for each metric while the plot 603 and the plot 605 on the right are histogram plots for the uniformity and bit-aliasing metrics for each chip and bit position, respectively. For the typical Cu metal fuse, the default state is a "short" (e.g., logical "0") prior to any programming, and thus, the Cu fuse array on its own cannot generate a unique random ID for a PUF application. However, the HCI fuse is a 2T bit-cell without a pre-defined default state such that prior to any programming event, the initial value is unknown and dependent on the randomness of process variation. This "initial" read data can be used to generate a PUF key. The analysis results of data from 434 die is shown in FIG. 6. The uniqueness metric represents the normalized inter-Hamming distance of one chip to another, i.e., uniqueness is a metric for how different one chip's key is compared to another chip's key. Ideally, a binary key will have uniqueness of 0.5 and thus 0.4985 is close to ideal. The uniformity metric is indicative of the randomness of the PUF on a given chip by evaluating the average value of the PUF key. Ideally, the "1s" and "0s" are uniformly distributed and the average value is 0.5, which suggests the measured average value of 0.5245 is close to ideal. The bit-aliasing metric checks that a specific bit position in the PUF key is random across chips. Once again, the ideal case is 0.5 so the measured average value of 0.5245 is close to ideal. It should be appreciated that the measurements for uniqueness, uniformity, and bit-aliasing described herein are exemplary and in other embodiments other example measurements can be obtained.

Typical PUF circuits suffer from relatively high reliability fail rates when compared to that of traditional fuse technologies, and thus, require extensive masking and error-code-correction (ECC) schemes. Moreover, the PUF bit of a previous approach has a bit-level fail rate of approximately 1.4×104 DPM after the utilization of masking and temporal voting techniques such that additional non-volatile memory (e.g., fuses) is needed to store error correction code (ECC) data in order to avoid unit-level fallout. In contrast, in an embodiment, the fuses themselves provide the unique PUF key for each chip, and a complicated masking and ECC scheme is unnecessary. In an embodiment, an advantage of using the HCI fuse for PUF applications is that programming a HCI-induced VT shift is a physical mechanism. Moreover, the in-field sense operation is at nominal voltage and thus has negligible impact to the device with respect to the relatively high HCI programming voltage. Consequently, implementing the PUF using HCI fuses avoids the instability that is encountered with typical PUF implementations since the in-field use case will not disturb the PUF key.

Figure 7:
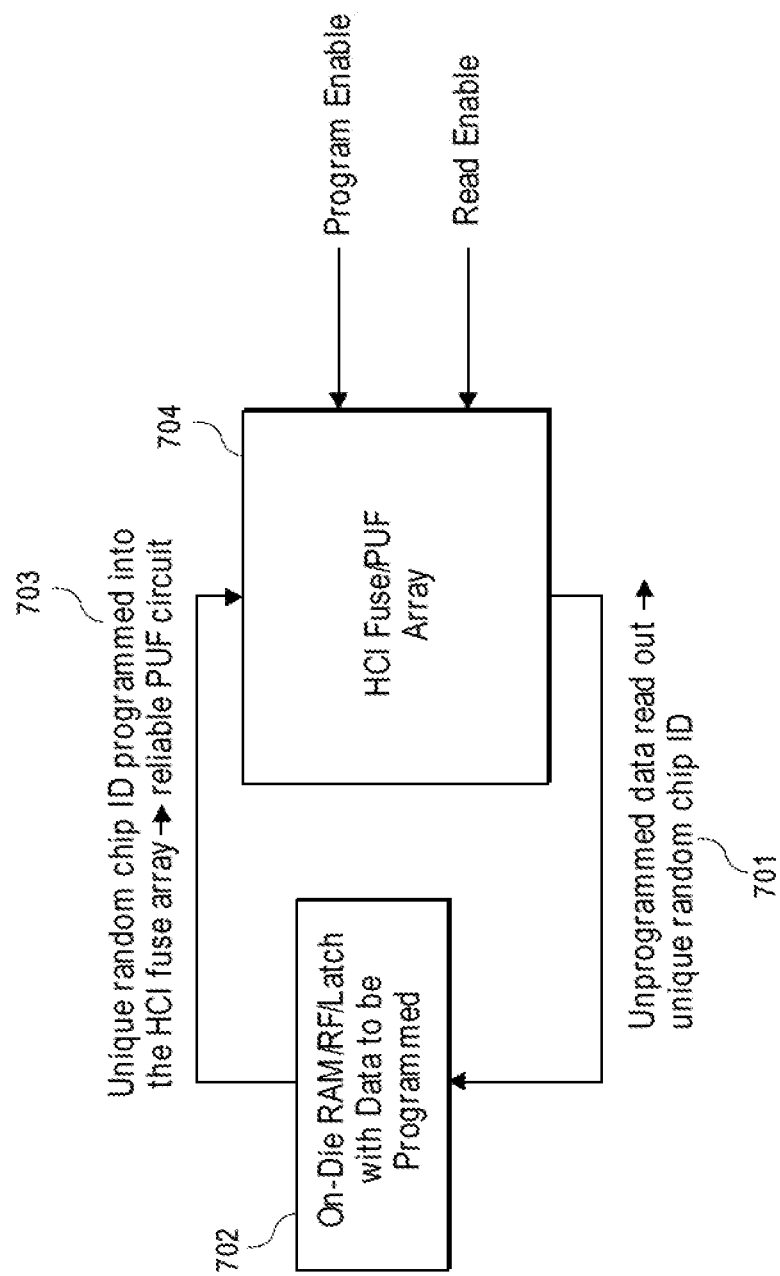
FIG. 7 is a flow diagram of a method in which the random default state of an HCI fuse array is read out and then programmed into the array in order to implement a reliable PUF circuit according to an embodiment.

FIG. 7 is a flow diagram of a method in which the random default state of an HCI fuse array is read out and then programmed into the array in order to implement a reliable PUF circuit according to an embodiment. FIG. 7 illustrates an HCI fuse implementation for PUF applications according to an embodiment. At 701, the "initial" read data (i.e., un-programmed data) is read out of the HCI fuse 704 in order to generate a unique random chip ID. In an embodiment, the data that is read out of the HCI fuse 704 is placed into a latch 702. In an embodiment, the latch 702 can include an on-die latch. In an embodiment, the latch can include an RF latch. In an embodiment, the latch can include RAM. At 703, the data is read from the latch 702 and programmed back into the HCI fuse/PUF array without the information being exposed outside of the chip. The final result is a random chip ID that can be used as a PUF key that has the reliability of a fuse technology. In an embodiment, the FIG. 7 example is suitable for security applications where the fuse cannot be readily hacked by de-processing. Unlike the standard Cu fuse technology, which has large voids in the programmed elements that can easily be seen from topdown imaging, the HCI fuse invention does not result in any visible physical damage such that a hacker cannot tell the difference between un-programmed and programmed bits.

Figure 8:
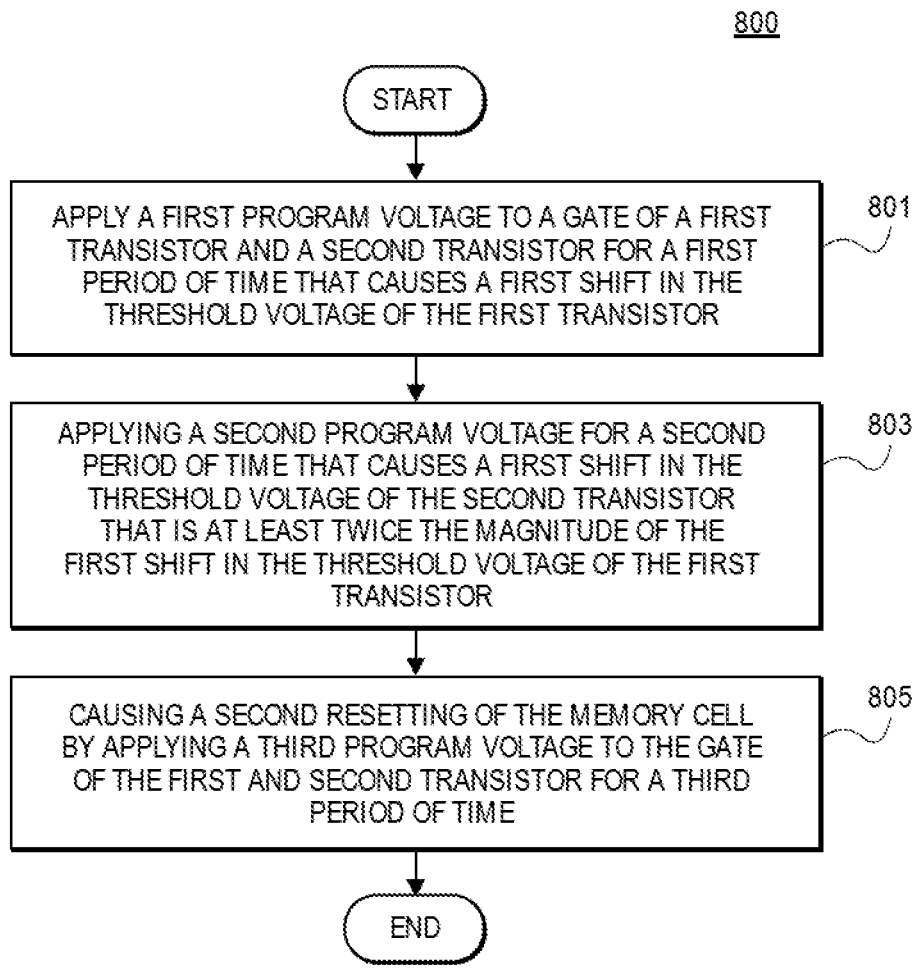
FIG. 8 is a flowchart of a method for reprogramming an HCI fuse two-transistor (2T) bit-cell according to an embodiment.

FIG. 8 is a flowchart of a method for reprogramming an HCI fuse two-transistor (2T) bit-cell according to an embodiment. Referring to FIG. 8, at 801, a memory cell of a memory cell array is programmed by applying a first program voltage to a gate of a first transistor of the memory cell and to a gate of a second transistor of the memory cell for a first duration that causes a first shift (e.g., a shift of magnitude at least equal to that of a sensing margin) in the threshold voltage of the first transistor and responsive to applying the first program voltage, providing access to a differential signal that includes voltages from a bit line of the first transistor and a bit line of the second transistor. In an embodiment, as used herein the term "sensing margin" is used to refer to the minimum voltage difference that is detectable by the sense amplifier.

At 803, a first resetting of the memory cell is caused by applying a second program voltage to the gate of the first transistor and to the gate of the second transistor for a second duration that causes a first shift in the threshold voltage of the second transistor that is at least twice the magnitude of the first shift in the threshold voltage of the first transistor (at least twice the sensing margin), and responsive to the applying the second program voltage, providing access to a differential signal that includes voltages from the bit line of the first transistor and from the bit line of the second transistor.

At 805, a second resetting of the memory cell is caused by applying a third program voltage to the gate of the first transistor and to the gate of the second transistor for a third duration that causes a second shift in the threshold voltage of the first transistor that is at least three times the magnitude of the first shift in the threshold voltage of the first transistor (at least three times the sensing margin), and responsive to applying the third program voltage, providing access to a third differential signal that includes voltages that correspond to the bit line of the first transistor and the bit line of the second transistor.

In an embodiment, the programming is from an initial un-programmed state of the memory cell present at fabrication. In an embodiment, the initial un-programmed state of the memory cell includes a random value. In an embodiment, the memory cell is an HCI fuse bit-cell. In an embodiment, the memory cell array is an HCI fuse array. In an embodiment, the memory cell array can be used to generate a random key for PUF applications.

Implementations of embodiments of the invention may be formed or carried out on a substrate, such as a semiconductor substrate. In one implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. Although a few examples of materials from which the substrate may be formed are described here, any material that may serve as a foundation upon which a semiconductor device may be built falls within the spirit and scope of the present invention.

A plurality of transistors, such as metal-oxide-semiconductor field-effect transistors (MOSFET or simply MOS transistors), may be fabricated on the substrate. In various implementations of the invention, the MOS transistors may be planar transistors, nonplanar transistors, or a combination of both. Nonplanar transistors include FinFET transistors such as double-gate transistors and tri-gate transistors, and wrap-around or all-around gate transistors such as nanoribbon and nanowire transistors. Although the implementations described herein may illustrate only planar transistors, it should be noted that the invention may also be carried out using nonplanar transistors.

Each MOS transistor includes a gate stack formed of at least two layers, a gate dielectric layer and a gate electrode layer. The gate dielectric layer may include one layer or a stack of layers. The one or more layers may include silicon oxide, silicon dioxide (SiO2) and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric layer include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric layer to improve its quality when a high-k material is used.

The gate electrode layer is formed on the gate dielectric layer and may consist of at least one P-type workfunction metal or N-type workfunction metal, depending on whether the transistor is to be a PMOS or an NMOS transistor. In some implementations, the gate electrode layer may consist of a stack of two or more metal layers, where one or more metal layers are workfunction metal layers and at least one metal layer is a fill metal layer.

For a PMOS transistor, metals that may be used for the gate electrode include, but are not limited to, ruthenium, palladium, platinum, cobalt, nickel, and conductive metal oxides, e.g., ruthenium oxide. A P-type metal layer will enable the formation of a PMOS gate electrode with a workfunction that is between about 4.9 eV and about 5.2 eV. For an NMOS transistor, metals that may be used for the gate electrode include, but are not limited to, hafnium, zirconium, titanium, tantalum, aluminum, alloys of these metals, and carbides of these metals such as hafnium carbide, zirconium carbide, titanium carbide, tantalum carbide, and aluminum carbide. An N-type metal layer will enable the formation of an NMOS gate electrode with a workfunction that is between about 3.9 eV and about 4.2 eV.

In some implementations, the gate electrode may consist of a "U"-shaped structure that includes a bottom portion substantially parallel to the surface of the substrate and two sidewall portions that are substantially perpendicular to the top surface of the substrate. In another implementation, at least one of the metal layers that form the gate electrode may simply be a planar layer that is substantially parallel to the top surface of the substrate and does not include sidewall portions substantially perpendicular to the top surface of the substrate. In further implementations of the invention, the gate electrode may consist of a combination of U-shaped structures and planar, non-U-shaped structures. For example, the gate electrode may consist of one or more U-shaped metal layers formed atop one or more planar, non-U-shaped layers.

In some implementations of the invention, a pair of sidewall spacers may be formed on opposing sides of the gate stack that bracket the gate stack. The sidewall spacers may be formed from a material such as silicon nitride, silicon oxide, silicon carbide, silicon nitride doped with carbon, and silicon oxynitride. Processes for forming sidewall spacers are well known in the art and generally include deposition and etching process steps. In an alternate implementation, a plurality of spacer pairs may be used, for instance, two pairs, three pairs, or four pairs of sidewall spacers may be formed on opposing sides of the gate stack.

As is well known in the art, source and drain regions are formed within the substrate adjacent to the gate stack of each MOS transistor. The source and drain regions are generally formed using either an implantation/diffusion process or an etching/deposition process. In the former process, dopants such as boron, aluminum, antimony, phosphorous, or arsenic may be ion-implanted into the substrate to form the source and drain regions. An annealing process that activates the dopants and causes them to diffuse further into the substrate typically follows the ion implantation process. In the latter process, the substrate may first be etched to form recesses at the locations of the source and drain regions. An epitaxial deposition process may then be carried out to fill the recesses with material that is used to fabricate the source and drain regions. In some implementations, the source and drain regions may be fabricated using a silicon alloy such as silicon germanium or silicon carbide. In some implementations the epitaxially deposited silicon alloy may be doped in situ with dopants such as boron, arsenic, or phosphorous. In further embodiments, the source and drain regions may be formed using one or more alternate semiconductor materials such as germanium or a group III-V material or alloy. And in further embodiments, one or more layers of metal and/or metal alloys may be used to form the source and drain regions.

One or more interlayer dielectrics (ILD) are deposited over the MOS transistors. The ILD layers may be formed using dielectric materials known for their applicability in integrated circuit structures, such as low-k dielectric materials. Examples of dielectric materials that may be used include, but are not limited to, silicon dioxide (SiO2), carbon doped oxide (CDO), silicon nitride, organic polymers such as perfluorocyclobutane or polytetrafluoroethylene, fluorosilicate glass (FSG), and organosilicates such as silsesquioxane, siloxane, or organosilicate glass. The ILD layers may include pores or air gaps to further reduce their dielectric constant.

Figure 9:
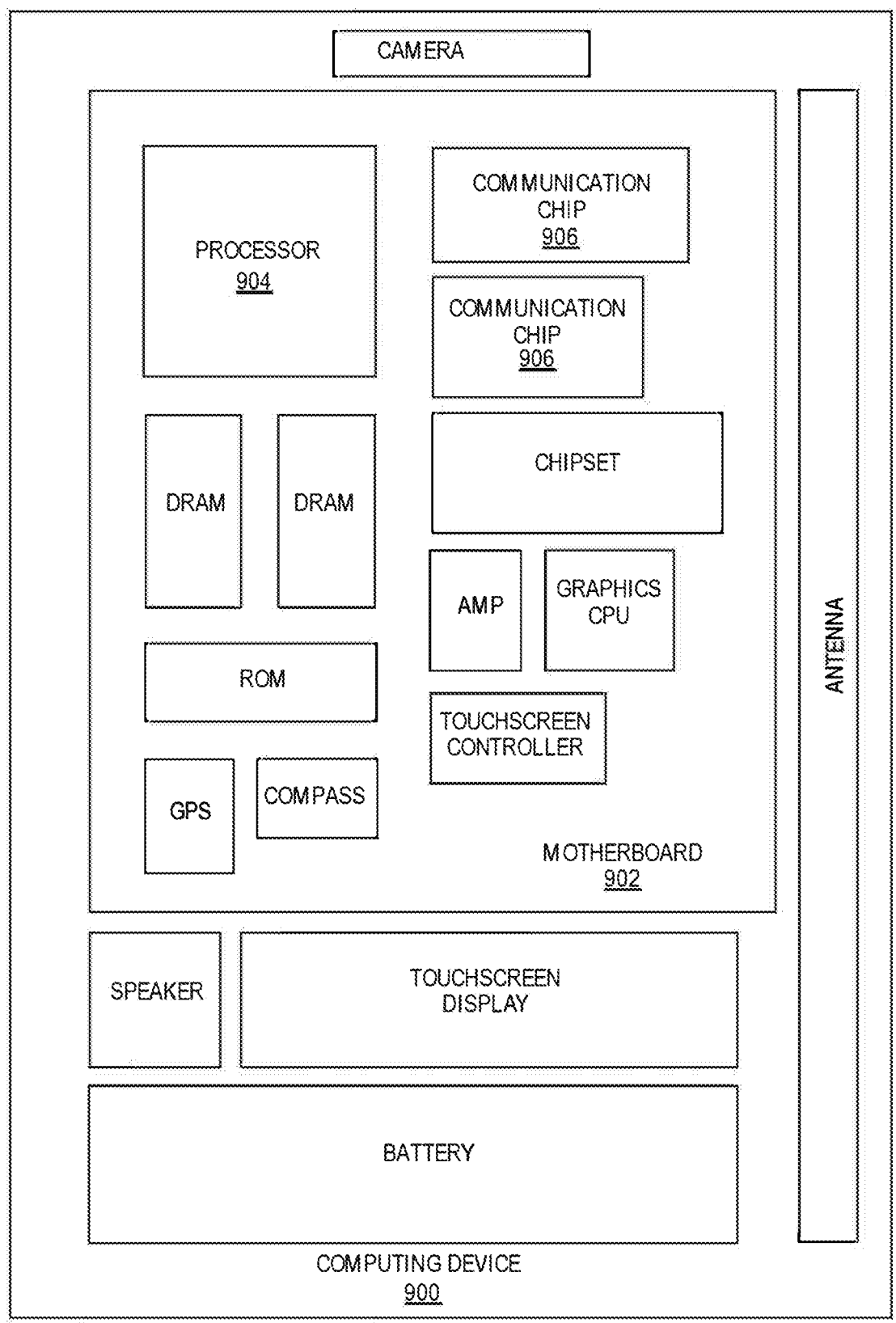
FIG. 9 illustrates a computing device in accordance with one implementation of the invention.

FIG. 9 illustrates a computing device 900 in accordance with one implementation of the invention. The computing device 900 houses a board 902. The board 902 may include a number of components, including but not limited to a processor 904 and at least one communication chip 906. The processor 904 is physically and electrically coupled to the board 902. In some implementations at least one communication chip 906 is also physically and electrically coupled to the board 902. In implementations, the communication chip 906 is part of the processor 904.

Depending on its applications, computing device 900 may include other components that may or may not be physically and electrically coupled to the board 902. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 906 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi and Bluetooth and a second communication chip 906 may be dedicated to longer range wireless communications such as GPS, EDGE, GPRS, CDMA, WiMAX, LTE, Ev-DO, and others.

The processor 904 of the computing device 900 includes an integrated circuit die packaged within the processor 904. In some implementations of the invention, the integrated circuit die of the processor includes one or more devices, such as MOS-FET transistors built in accordance with implementations of the invention. The term "processor" may refer to any device or portion of a device that processes electronic data from registers and/or memory to transform that electronic data into other electronic data that may be stored in registers and/or memory.

The communication chip 906 also includes an integrated circuit die packaged within the communication chip 906. In accordance with another implementation of the invention, the integrated circuit die of the communication chip includes one or more devices, such as MOS-FET transistors built in accordance with implementations of the invention.

In further implementations, another component housed within the computing device 900 may contain an integrated circuit die that includes one or more devices, such as MOS-FET transistors built in accordance with implementations of the invention.

In various implementations, the computing device 900 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

Figure 10:
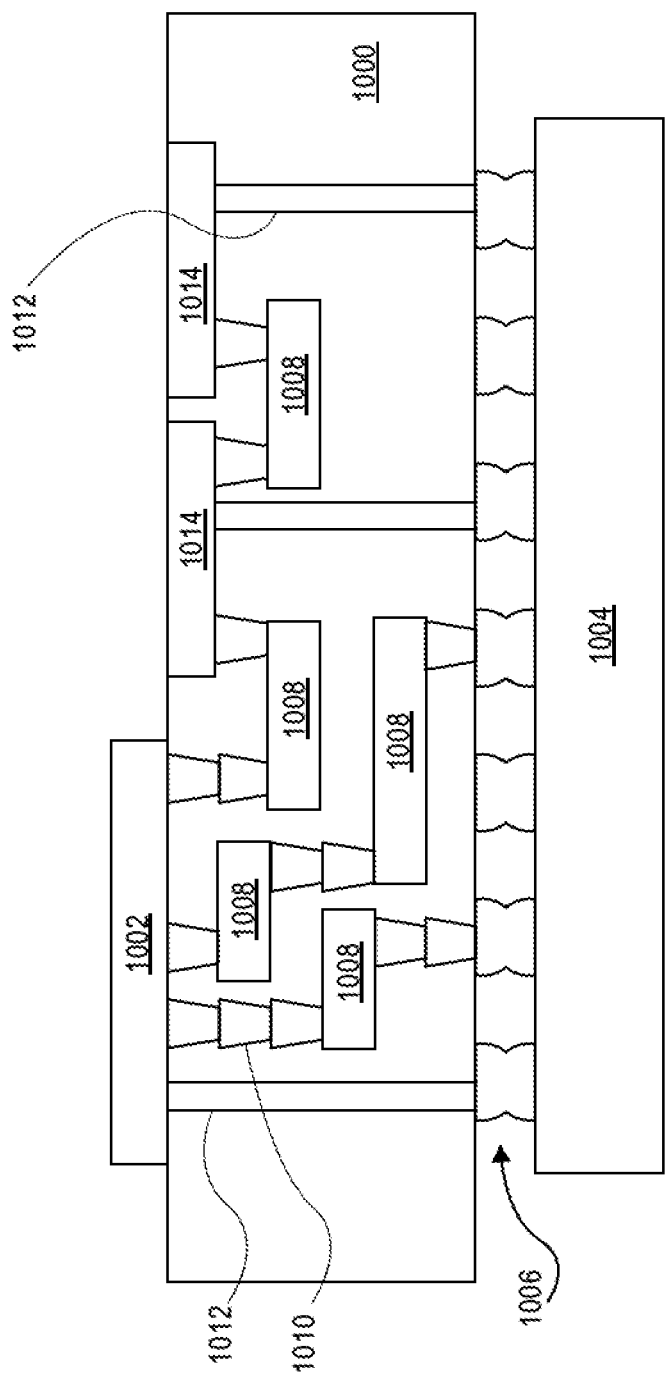
FIG. 10 illustrates an interposer that includes one or more embodiments of the invention.

FIG. 10 illustrates an interposer 1000 that includes one or more embodiments of the invention. The interposer 1000 is an intervening substrate used to bridge a first substrate 1002 to a second substrate 1004. The first substrate 1002 may be, for instance, an integrated circuit die. The second substrate 1004 may be, for instance, a memory module, a computer motherboard, or another integrated circuit die. Generally, the purpose of an interposer 1000 is to spread a connection to a wider pitch or to reroute a connection to a different connection. For example, an interposer 1000 may couple an integrated circuit die to a ball grid array (BGA) 1006 that can subsequently be coupled to the second substrate 1004. In some embodiments, the first and second substrates 1002/1004 are attached to opposing sides of the interposer 1000. In other embodiments, the first and second substrates 1002/1004 are attached to the same side of the interposer 1000. And in further embodiments, three or more substrates are interconnected by way of the interposer 1000.

The interposer 1000 may be formed of an epoxy resin, a fiberglass-reinforced epoxy resin, a ceramic material, or a polymer material such as polyimide. In further implementations, the interposer may be formed of alternate rigid or flexible materials that may include the same materials described above for use in a semiconductor substrate, such as silicon, germanium, and other group III-V and group IV materials.

The interposer may include metal interconnects 1008 and vias 1010, including but not limited to through-silicon vias (TSVs) 1012. The interposer 1000 may further include embedded devices 1014, including both passive and active devices. Such devices include, but are not limited to, capacitors, decoupling capacitors, resistors, inductors, fuses, diodes, transformers, sensors, and electrostatic discharge (ESD) devices. More complex devices such as radio-frequency (RF) devices, power amplifiers, power management devices, antennas, arrays, sensors, and MEMS devices may also be formed on the interposer 1000. In accordance with embodiments of the invention, apparatuses or processes disclosed herein may be used in the fabrication of interposer 1000.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of the present application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The following examples pertain to further embodiments. The various features of the different embodiments may be variously combined with some features included and others excluded to suit a variety of different applications.

Example embodiment 1: Memory cell circuitry includes a first transistor configured to have a threshold voltage of the first transistor modulated by hot carrier injection, a second transistor coupled to the first transistor and configured to have a threshold voltage of the second transistor modulated by hot carrier injection, a word line coupled to a gate of the first transistor and to a gate of the second transistor, a first bit line coupled to the first transistor and a second bit line coupled to the second transistor, and a source line coupled to the drain of the first transistor and to the drain of the second transistor, the word line and the source line configured to cause hot carrier injection (HCI) into the first transistor when a first supply voltage is applied to the word line and the source line, and the second bit line is floated and the first bit line is grounded, and into the second transistor when a first supply voltage is applied to the word line and the source line, and the first bit line is floated and the second bit line is grounded.

Example embodiment 2: The memory cell circuitry of example embodiment 1, further comprising a sense amplifier configured to access a differential voltage from the first bit line and the second bit line in response to a second supply voltage being applied to the word line and to the source line.

Example embodiment 3: The memory cell circuitry of example embodiment 1, further comprising a bit cell that includes the first transistor and the second transistor and is an HCI fuse bit cell.

Example embodiment 4: The memory cell circuitry of example embodiment 1, wherein the hot carrier injection into the first transistor causes Vt degradation of the first transistor and the hot carrier injection into the second transistor causes Vt degradation of the second transistor.

Example embodiment 5: The memory cell circuitry of example embodiment 4, wherein the Vt degradation of the first transistor causes the storage of a first logic level.

Example embodiment 6: The memory cell circuitry of example embodiment 4, wherein the Vt degradation of the second transistor causes the storage of a second logic level.

Example embodiment 7: The memory cell circuitry of example embodiment 3, 4, 5 and 6 wherein un-programmed memory cell circuitry contains a random value that is used to generate a random key for physical unclonable fuse (PUF) applications.

Example embodiment 8: A memory cell array including input and output circuitry and a plurality of memory cells that include: a first transistor configured to have a threshold voltage of the first transistor modulated by hot carrier injection, a second transistor coupled to the first transistor and configured to have a threshold voltage of the second transistor modulated by hot carrier injection, a word line coupled to a gate of the first transistor and to a gate of the second transistor, a first bit line coupled to the first transistor and a second bit line coupled to the second transistor and a source line coupled to the drain of the first transistor and to the drain of the second transistor, the word line and the source line configured to cause hot carrier injection (HCI) into the first transistor when a first supply voltage is applied to the word line and the source line, and the second bit line is floated and the first bit line is grounded, and into the second transistor when the first supply voltage is applied to the word line and the source line, and the first bit line is floated and the second bit line is grounded.

Example embodiment 9: The memory cell array of example embodiment 8, further comprising a sense amplifier configured to access a differential voltage from the first bit line and the second bit line in response to a second supply voltage being applied to the word line and to the source line.

Example embodiment 10: The memory cell array of example embodiment 8, wherein the memory cells include an HCI fuse bit cell.

Example embodiment 11: The memory cell array of example embodiment 8, 9 and 10, wherein hot carrier injection into the first transistor causes Vt degradation of the first transistor and hot carrier injection into the second transistor causes Vt degradation of the second transistor.

Example embodiment 12: The memory cell array of example embodiment 11, wherein the Vt degradation of the first transistor causes the storage of a first logic level.

Example embodiment 13: The memory cell array of example embodiment 11, wherein the Vt degradation of the second transistor causes the storage of a second logic level.

Example embodiment 14: The memory cell array of example embodiment 10, wherein an un-programmed memory cell contains a random value that is used to generate a random key for physical unclonable function (PUF) applications.

Example embodiment 15: A method includes programming a memory cell of memory cell array, including: applying a first program voltage to a gate of a first transistor of the memory cell and to a gate of a second transistor of the memory cell for a first duration that causes a first shift in the threshold voltage of the first transistor, and responsive to the applying the first program voltage, providing access to a differential signal that includes voltages that correspond to a bit line of the first transistor and a bit line of the second transistor, causing a first reset of the memory cell, including, applying a second program voltage to the gate of the first transistor and to the gate of the second transistor for a second duration that causes a first shift in the threshold voltage of the second transistor that is at least twice the magnitude of the first shift in the threshold voltage of the first transistor, and responsive to the applying the second program voltage, providing access to a differential signal that includes voltages from the bit line of the first transistor and from the bit line of the second transistor, causing a second reset of the memory cell, including, applying a third program voltage to the gate of the first transistor and to the gate of the second transistor for a third duration that causes a second shift in the threshold voltage of the first transistor that is at least three times the magnitude of the first shift in the threshold voltage of the first transistor, and responsive to the applying the third program voltage, providing access to a third differential signal that includes voltages that correspond to the bit line of the first transistor and the bit line of the second transistor.

Example embodiment 16: The method of example embodiment 15, wherein the programming is from an initial un-programmed state of the memory cell present at fabrication.

Example embodiment 17: The method of example embodiment 16, wherein the initial un-programmed state of the memory cell includes a random value.

Example embodiment 18: The method of example embodiment 15, wherein the memory cell is an HCI fuse bit-cell.

Example embodiment 19: The method of example embodiment 15, wherein the memory cell array is an HCI fuse array.

Example embodiment 20: The method of claims 15, 16, 17, 18 and 19 wherein the memory cell array can be used to generate a random key for PUF applications.

What is claimed is:

1. Memory cell circuitry, comprising:
a first transistor configured to have a threshold voltage of the first transistor modulated by hot carrier injection;
a second transistor coupled to the first transistor and configured to have a threshold voltage of the second transistor modulated by hot carrier injection;
a word line coupled to a gate of the first transistor and to a gate of the second transistor; a first bit line coupled to the first transistor and a second bit line coupled to the second transistor;
a source line coupled to the drain of the first transistor and to the drain of the second transistor, the word line and the source line configured to cause hot carrier injection (HCI) into the first transistor when a first supply voltage is applied to the word line and the source line, and the second bit line is floated and the first bit line is grounded, and into the second transistor when a first supply voltage is applied to the word line and the source line, and the first bit line is floated and the second bit line is grounded; and
a bit cell that includes the first transistor and the second transistor and is an HCI fuse bit cell, wherein the un-programmed bit cell contains a random value that is used to generate a random key for physical unclonable function (PUF) applications.

2. The memory cell circuitry of claim 1, further comprising a sense amplifier configured to access a differential voltage from the first bit line and the second bit line in response to a second supply voltage being applied to the word line and to the source line.

3. The memory cell circuitry of claim 1, wherein the hot carrier injection into the first transistor causes Vt degradation of the first transistor and the hot carrier injection into the second transistor causes Vt degradation of the second transistor.

4. The memory cell circuitry of claim 3, wherein the Vt degradation of the first transistor causes the storage of a first logic level.

5. The memory cell circuitry of claim 3, wherein the Vt degradation of the second transistor causes the storage of a second logic level.

6. A memory cell array, comprising:
input and output circuitry; and
a plurality of memory cells that include:
a first transistor configured to have a threshold voltage of the first transistor modulated by hot carrier injection;
a second transistor coupled to the first transistor and configured to have a threshold voltage of the second transistor modulated by hot carrier injection;
a word line coupled to a gate of the first transistor and to a gate of the second transistor; a first bit line coupled to the first transistor and a second bit line coupled to the second transistor;
a source line coupled to the drain of the first transistor and to the drain of the second transistor, the word line and the source line configured to cause hot carrier injection (HCI) into the first transistor when a first supply voltage is applied to the word line and the source line, and the second bit line is floated and the first bit line is grounded, and into the second transistor when a first supply voltage is applied to the word line and the source line, and the first bit line is floated and the second bit line is grounded; and
a bit cell that includes the first transistor and the second transistor and is an HCI bit cell fuse, wherein the un-programmed bit cell contains a random value that is used to generate a random key for physical unclonable function (PUF) applications.

7. The memory cell array of claim 6, further comprising a sense amplifier configured to access a differential voltage from the first bit line and the second bit line in response to a second supply voltage being applied to the word line and to the source line.

8. The memory cell array of claim 6, wherein hot carrier injection into the first transistor causes Vt degradation of the first transistor and hot carrier injection into the second transistor causes Vt degradation of the second transistor.

9. The memory cell array of claim 8, wherein the Vt degradation of the first transistor causes the storage of a first logic level.

10. The memory cell array of claim 8, wherein the Vt degradation of the second transistor causes the storage of a second logic level.

11. A method, comprising:
programming a memory cell of memory cell array, including:
applying a first program voltage to a gate of a first transistor of the memory cell and to a gate of a second transistor of the memory cell for a first duration that causes a first shift in the threshold voltage of the first transistor; and
responsive to the applying the first program voltage, providing access to a differential signal that includes voltages that correspond to a bit line of the first transistor and a bit line of the second transistor;
causing a first reset of the memory cell, including:
applying a second program voltage to the gate of the first transistor and to the gate of the second transistor for a second duration that causes a first shift in the threshold voltage of the second transistor that is at least twice the magnitude of the first shift in the threshold voltage of the first transistor; and
responsive to the applying the second program voltage, providing access to a differential signal that includes voltages from the bit line of the first transistor and from the bit line of the second transistor;
causing a second reset of the memory cell, including:
applying a third program voltage to the gate of the first transistor and to the gate of the second transistor for a third duration that causes a second shift in the threshold voltage of the first transistor that is at least three times the magnitude of the first shift in the threshold voltage of the first transistor; and
responsive to the applying the third program voltage, providing access to a third differential signal that includes voltages that correspond to the bit line of the first transistor and the bit line of the second transistor.

12. The method of claim 11, wherein the programming is from an initial un-programmed state of the memory cell present at fabrication.

13. The method of claim 12, wherein the initial un-programmed state of the memory cell includes a random value.

14. The method of claim 11, wherein the memory cell is an HCI fuse bit-cell.

15. The method of claim 11, wherein the memory cell array is an HCI fuse array.

16. The method of claim 11, wherein the memory cell array can be used to generate a random key for PUF applications.

\* \* \* \* \*